United States Patent [19]

Pampouchidis

[11] 4,238,594
[45] Dec. 9, 1980

[54] CATHODICALLY DEPOSITABLE URETHANE COMPOSITIONS AND PROCESS FOR SAME

[75] Inventor: Georgios Pampouchidis, Graz, Austria

[73] Assignee: Vianova Kunstharz, A.G., Vienna, Austria

[21] Appl. No.: 816,936

[22] Filed: Jul. 19, 1977

[30] Foreign Application Priority Data

Jul. 19, 1976 [AT] Austria ................................ 5284/76
Oct. 29, 1976 [AT] Austria ................................ 8068/76
Oct. 29, 1976 [AT] Austria ................................ 8069/76
Dec. 20, 1976 [AT] Austria ................................ 9455/76

[51] Int. Cl.$^3$ .................... C08G 18/12; C08G 18/71; C08G 18/62; C08G 18/58
[52] U.S. Cl. ................................. 528/69; 204/181 C; 260/18 TN; 260/29.2 TN; 525/459; 528/75;
[58] Field of Search ............... 528/75, 69; 204/181 C; 260/18 TN, 29.2 TN

[56] References Cited

U.S. PATENT DOCUMENTS

| | | | |
|---|---|---|---|
| 3,804,786 | 4/1974 | Sekmakas | 260/29.2 EP |
| 4,031,050 | 6/1977 | Jerabek | 204/181 C |
| 4,036,800 | 7/1977 | Sekmakas | 204/181 C |
| 4,096,105 | 6/1978 | McGinniss | 204/181 C |
| 4,129,490 | 12/1978 | Schimmel | 204/181 C |
| 4,147,679 | 4/1979 | Scriven et al. | 260/29.2 TN |

FOREIGN PATENT DOCUMENTS 2441234 2/1975 Fed. Rep. of Germany .
2252536 7/1976 Fed. Rep. of Germany .
2363074 7/1976 Fed. Rep. of Germany .
2100794 3/1972 France .

*Primary Examiner*—H. S. Cockeram
*Attorney, Agent, or Firm*—A. W. Breiner

[57] ABSTRACT

Self-crosslinking coating compositions which are cathodically deposited on electrodeposition of paints containing the coating composition and a process for producing aqueous solutions of the self-crosslinking coating compositions by acid neutralization are described. The coating compositions are the reaction products of an unsaturated copolymer or a polycondensation product or a polyaddition product or mixture thereof carrying at least 0.5 double bonds on a side chain or at the end of a chain for each 1000 molecular weight units and the reaction product carrying one free isocyanate group of a polyisocyanate with an amine of the general formula —

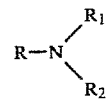

wherein R is an alkanol or hydroxyphenyl radical and $R_1$ and $R_2$ are alkyl, aryl or cycloalkyl radicals. The cathodically depositable electrodeposition paints cure rapidly at relatively low temperatures to provide films which are highly resistant to corrosive influences.

28 Claims, No Drawings

CATHODICALLY DEPOSITABLE URETHANE COMPOSITIONS AND PROCESS FOR SAME

The present invention is directed to the preparation of coating compositions which are water dilutable upon neutralization with acids and which are electrically depositable at the cathode of an electrodeposition cell and which crosslink through thermal polymerization without additional components.

Electrophoretic deposition of synthetic resins and plastics, also called electrodeposition, although known for quite some time, only gained technical importance as a coating process in recent years. The coating compositions or binders presently known for electrical deposition contain polycarboxylic acid resins neutralized with bases. The products deposit at the anode. Owing to the acidic character of the binders they are sensitive to the corroding influences exerted by salts and particularly by alkaline materials. Furthermore, coatings of the aforesaid compositions tend to discolor, water spot, or undergo other chemical changes as a result of the metal ions which are anodically dissolved from the anode.

Numerous binders are disclosed in the prior art which include groups neutralizable with acids, which can be deposited on cathodically wired objects through the action of an electric current. The most serious problem with such coating compositions is the non-availability of normally used crosslinking aids which, with anodic deposition, are represented by a more or less acidic film or the oxygen originating at the anode. The known coating compositions which are cathodically depositable through introduction of amine groups, therefore, require the addition of acid catalysts to enable the reaction with cross-linking agents, i.e. amine or phenolic resins. It is evident that these substances adversely influence stability of the electrodeposition bath as well as application characteristics and film properties.

U.S. Pat. No. 3,804,786 discloses cathodically depositable coating compositions which are prepared through reaction of an epoxy resin with an unsaturated carboxylic acid, such as acrylic acid or a fatty acid. An increase in molecular size is obtained through reaction of a diisocyanate with the secondary hydroxy groups formed by the epoxide reaction and introduction of a basic nitrogen atom through reaction of additional epoxide groups with a secondary alkyl or alkanol amine. These coating compositions, unless unsaturated fatty acids are used, require amine resins as external crosslinking agents. In the manufacture of the binders, control of the various reaction steps, particularly of the reaction with the isocyanate, is extremely difficult. Furthermore, it is quite impossible to make any variation in the introduction of the basic centers, since only the remaining epoxy group is free for such reaction. The basicity of the system is relatively low, thus substantial neutralization with acids is necessary and the resulting pH values of the solutions are very low (below 5). Furthermore, the curing capacity of the system is relatively low, requiring high stoving temperatures (200°–260° C.).

DT-AS No. 22 52 536 and DT-AS No. 23 63 074 disclose cathodically depositable coating compositions which are produced through reaction of epoxy and hydroxy groups containing resins with semi-masked polyisocyanates, and, in the second case, with subsequent reaction of the epoxy groups with tertiary amine salts of acids, resulting in the formation of onium salt groups. The products cure through urethane crosslinking at elevated temperature upon demasking of the ioscyanate groups. The main disadvantage of the latter method is the elimination from the film of the separated masking substance leading to pollution of the stoving equipment and the air. It is evident that the residue of the masking substances in the film have an adverse effect on the properties of the cured film.

FR-PS No. 2,100,794 discloses mixtures of polyamide-polyamine resins with completely masked polyisocyanates. Curing is effected through urethane crosslinking upon demasking of the isocyanate groups. The disadvantages noted for the resins of the aforesaid German Auslegeschrifts are again obtained.

Similar products are disclosed in DT-OS No. 24 41 234 where epoxy resin-amine adducts are reacted with polyamide resins containing, in reacted form, semi-masked diisocyanates as crosslinking component. The masking substances again cause problems upon release.

It has now been found that coating compositions for cathodically depositable electrodeposition paints which are thermosetting, i.e., they do not require crosslinking agents, and which no not have the disadvantages of the products heretofore known in the art, can be produced if a polymerizable base resin is reacted with a basic monoisocyanate intermediate and the resulting polymerizable basic urethane modified resin is rendered water soluble through partial or total neutralization with acids. The present invention is concerned, therefore, with new compositions and a process for producing thermosetting coating compositions for cathodically depositable electrodeposition paints, characterized in that an unsaturated copolymer and/or polycondensation product and/or polyaddition product, containing for each 1000 molecular weight units at least 0.5, and preferably 0.8 to 3.0, side chain or chain ending double bonds, is reacted with a reaction product having one free isocyanate group and being obtained from aromatic and/or aliphatic and/or cycloaliphatic di- or polyisocyanates and an amine of the general formula

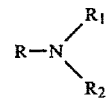

wherein R is an alkanol or hydroxyphenyl radical and $R_1$ and $R_2$ is alkyl, aryl or cycloalkyl radicals, and the reaction product rendered water soluble through partial or total neutralization with inorganic and/or organic acids. Depending on the final use, base resins with a higher or lower number of double bonds, i.e., the number of double bonds in 1000 molecular weight units can be chosen to obtain various polymerization capacities, it only being essential that there is at least 0.5 double bonds for each 1000 molecular weight units.

The binders of the invention are self-crosslinking and cure through heat polymerization of the $\alpha,\beta$-unsaturated double bonds. The resulting films exhibit superior resistance to chemicals, water, alkali, and corrosion.

It is a particular advantage of the present invention that the basicity of the end products can be adjusted, despite the various compositions and molecular weights of the base resins, such that with partial neutralization only, with a pH-value range of from 6–8, the end products are dilutable with water and can be electrodeposited. Problems encountered with bath stability as well as problems with possible corrosion of application and stoving equipment through the released acids are thereby prevented.

Another primary advantage of the coating compositions of the invention is that the compositions do not require hardening components or acid catalysts for curing, precluding any problems with such components. In addition, aqueous solutions of the present class of coating compositions afford excellent conductivity. The deposited films, however, have good insulating characteristics. Thus, deposition can be carried out at high voltage, which, in turn, is a preliminary condition for good throwing power of the coating composition. Still another advantage of the present invention is the fact that the coating compositions of the invention carry the double bonds exclusively at the end of a chain (chain end) or in a side chain. Curing through thermic polymerization can, therefore, be effected at relatively low temperatures during short stoving times. Finally, curing of the coating compositions of the invention is effected through thermic polymerization of the —C=C— double bonds. Through this —C—C— crosslinking the resulting coatings afford excellent resistance to water, chemicals, and other corroding influences which is of paramount importance.

Synthesis of the base resins is accomplished with a variety of raw materials to introduce $\alpha,\beta$-unsaturated, chain end or side chain double bonds. No claim is made for the preparation of such base resins. The following will provide details and modifications of various methods of synthesis:

(A) Macromolecules with polymerizable double bonds are obtained through addition reaction of $\alpha,\beta$-unsaturated monocarboxylic acids to materials carrying epoxy groups.

Suitable $\alpha,\beta$-unsaturated monocarboxylic acids are acrylic acid, methacrylic acid, crotonic acid as well as semiesters of maleic acid or itaconic acid with saturated alcohols, or semiesters of other aliphatic, cycloaliphatic or aromatic dicarboxylic acids with $\alpha,\beta$-ethylenically unsaturated monoalcohols, e.g., semiesters obtained through reaction of succinic anhydride, phthalic anhydride, tetra- or hexahydrophthalic anhydride with hydroxy alkylacrylates or -methacrylates or with esters of acrylic acid with di-, tri- or polyalkylene glycols.

The raw materials carrying epoxy groups most widely known, with the common characteristic of structures according to the formula

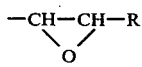

wherein R is hydrogen or alkyl, are the glycidyl ethers of phenols, particularly of 4,4'-bis(hydroxyphenyl)-propane (Bisphenol A). Glycidyl ethers of phenol formaldehyde condensates of the novolak type are also useful as well as glycidyl esters of aliphatic, aromatic or cycloaliphatic mono- or polycarboxylic acids, glycidyl ethers of aliphatic or cycloaliphatic diols or polyols, copolymers of glycidyl(meth)arcylate or epoxidized products of aliphatic or cycloaliphatic olefines. A. M. Paquin, in *Epoxidverbindung und Epoxyharze*, Springer 1958, gives a detailed survey of this class of materials which can be used in accordance with the present invention.

The type and quantity of epoxy resin and unsaturated monocarboxylic acid are chosen in order that on equivalent addition, the macromolecule contains a number of polymerizable double bonds sufficient to provide the necessary degree of crosslinking on curing. In general, a double bond value of at least 0.5, preferably 0.8–3.0, is required, i.e., a minimum of 0.5 double bonds is introduced into 1000 molecular weight units.

In one modification, saturated or unsaturated fatty acids can partly replace the $\alpha,\beta$-unsaturated carboxylic acid or the hydroxy acrylates. However, the level should not surpass 50 mole-%, calculated on the reaction partners for the epoxy groups, otherwise the capacity for thermic crosslinking is reduced to an extent so as to adversely influence the quality of the stoved film.

In another modification of the process which will afford special advantages, the unsaturated polyaddition product is a reaction product of 2 moles of diepoxy compound, 1 mole of aliphatic dicarboxylic acid and 2 moles of acrylic acid and/or methacrylic acid. The coating compositions based on such binders upon curing gives films with good crosslinking and excellent surface quality. This group of base resins is prepared in order that in a first step 2 moles of diepoxy compound are reacted at 100° to 160° C. with 1 mole of an aliphatic dicarboxylic acid, until an acid value of practically 0 is obtained. Subsequently, the modified diepoxy compound is reacted with 2 moles of acrylic acid and/or methacrylic acid at 90° to 120° C., optionally in the presence of inhibitors such as hydroquinone. Very uniform products are still obtainable if all components are reacted simultaneously at from 100° to 140° C. The preferred epoxy compounds are the diglycidyl ethers of phenols, particularly of 4,4'-bis(hydroxyphenyl)-propane (Bisphenol A) or its hydrated or alkyl or halogen substituted derivatives with epichlorohydrin. Suitable aliphatic dicarboxylic acids are those which carry at least 3 C-atoms in the main chain, such as malonic acid, succinic acid, glutaric acid, adipic acid, pimelic acid, suberic acid, azelaic acid, sebacic acid, tetradecane dicarboxylic acid and the branched isomers of these acids. The reaction with the diepoxy compound is carried out either first with the aliphatic dicarboxylic acid at 100° to 160° C. and subsequently with the unsaturated monocarboxylic acid at 100° to 110° C., or, preferably simultaneously with both carboxy components, at 100° to 140° C., coemploying polymerization inhibitors. Type and quantity of epoxy resin, aliphatic dicarboxylic acid and unsaturated monocarboxylic acid is chosen in order that the macromolecule contains sufficient polymerizable double bonds to give a sufficient degree of crosslinking on curing. In general, as previously noted, a double bond value of at least 0.5, preferably 0.8–3.0, is to be introduced into 100 molecular weight units.

(B) Macromolecules with polymerizable double bonds suitable for use herein are copolymers with free carboxy groups which are reacted with unsaturated glycidyl compounds, including glycidyl acrylate or methacrylate.

(C) An additional class of macromolecules suitable for use herein are prepared from hydroxy and/or carboxy group containing polycondensation products, polyaddition products or polymerization products, the functional groups of which are reacted with an unsaturated monoisocyanate compound (obtained through reaction of equimolar quantities of diisocyanates with hydroxyacrylates or -methacrylates). The starting materials can include suitable polyesters, modified or unmodified alkyd resins, hydroxyl group containing copolymers, reaction products of polyols with adducts of maleic anhydride to compound with isolated or conjugated double bonds. Further, polymeric products with anhydride structures, e.g., styrene-maleic anhydride copolymers, adducts of maleic anhydride to compounds carrying isolated or conjugated double bonds, including oils, fatty acids, resin acids, diene polymers, etc., can be reacted with hydroxyalkylacrylates or -methacrylates at 80° to 120° C. to give semiesters with the desired structure.

Suitable basic isocyanate intermediates are reaction products of aromatic, aliphatic, or cycloaliphatic di- or polyisocyanates or mixtures thereof with amines of the general formula

wherein R is alkanol or hydroxyphenyl and $R_1$ and $R_2$ are each alkyl, aryl or cycloalkyl, e.g., dialkanolamines such as dimethylethanol amine, its higher homologues or isomers. The reaction is carried out at from 10° to 80° C., preferably 20° to 50° C. The reaction is exothermic. The weight ratios between the reaction pairs are chosen in order that the isocyanate intermediate contains one free isocyanate group.

Suitable di- or polyisocyanates are the aromatic polyisocyanates including 2,4- or 2,6 tolulene diisocyanate, 4,4' diphenylmethane diisocyanate; diphenylmethylmethane-4,4' diisocyanate; naphthylene-1,5-diisocyanate; triphenylmethane-4,4', 4" triisocyanate; the cycloaliphatic isocyanates including isophorone diisocyanate; cyclohexane-1,4-diisocyanate, and aliphatic isocyanates including trimethyl-hexamethylene-1,6-diisocyanate and trishexamethylene-triisocyanate.

The process of the invention is carried out in order that the mentioned polymerizable starting resins, preferably dissolved in isocyanate inert solvents, are reacted at 20° to 80° C., preferably at from 40° to 60° C. with the disired quantity of isocyanate intermediate. At 50° C., the reaction is finished after about one hour, at lower temperatures it takes comparatively longer. The quantity of basic isocyanate intermediate is chosen in order that the basicity of the coating composition upon neutralization with the acid has satisfactory dilutability with water at a pH-value of from 4 to 9, preferably 6–8.

In a preferred modification of the process the unsaturated copolymer and/or polycondensate and/or polyaddition product, in addition to the basic amine isocyanate intermediate is reacted with from 10 to 100 mole-% (on the sum of still free hydroxy and carboxy groups) of a reaction product carrying one free isocyanate group which is obtained from aliphatic and/or aromatic and/or cycloaliphatic di- or polyisocyanates and an unsaturated and/or saturated monoalcohol with at least 6 C-atoms. The compositions obtained have superior surface qualities, mechanical properties, and resistances to corrosion. Optimizing of the properties of the coating compositions can also be effected by reacting the unsaturated copolymer and/or polycondensate and/or polyaddition product, in addition to the basic amine isocyanate reaction product, with from 10 to 100 mole-% of a reaction product carrying one free isocyanate group and which is obtained from an aliphatic and/or aromatic and/or cycloaliphatic di- or polyisocyanate and an unsaturated and/or saturated monocarboxylic acid with at least 6 C-atoms. The reaction with the aforesaid additional components can be carried out simultaneously or after reaction with the hydroxyacrylate isocyanate reaction product as previously described. In a further modification the isocyanate intermediates modifying the base resin can be introduced as the concurrent reaction product of 1 mole of diisocyanate, 0.4–0.9 moles of the amine and 0.1 to 0.6 moles of a suitable monoalcohol or monocarboxylic acid. The quantity of the reaction pairs is chosen in order that 1 mole of diisocyanate is reacted with 1 mole of the blend of amine and monoalcohol or monocarboxylic acid.

Examples of suitable unsaturated monoalcohols include 4-hydroxybutylacrylate; 6-hydroxyhexylacrylate; tripropyleneglycolmonoacrylate; tetrapropyleneglycolmonoacrylate, and the corresponding methacrylates, and/or long chain unsaturated monoalcohols including 10-undecene-1-ol; 9 c-octadecene-1-ol (oleylalcohol); 9 t-octadecene-1-ol (elaidylalcohol); 9 c, 12 c-octadecadiene-1-ol (linoleyl alcohol); 9 c, 12 c, 15 c-octadecatriene-1-ol (linolenyl alcohol); 9 c-eicosene-1-ol (gadoleyl alcohol); 13 c-docosene-1-ol (eruca alcohol); and 13 t-docosene-1-ol (brassidyl alcohol). Saturated long chain monoalcohols can be coemployed in suitable level to enhance flow characteristics. Such monoalcohols include hexanol, nonanol, decanol and their homologues, such as dodecanol (laurylalcohol), octadecanol (stearylalcohol), etc., as well as alkyl alcohols such as 2-ethylhexanol, 2-pentylnonanol, 2-decyltetradecanol, and other alcohols known as Guerbet-alcohols. Suitable long chain saturated or unsaturated monocarboxylic acids with at least 6 C-atoms include n-capronic acid, isononanoic acid, lauric acid, palmitic acid, oleic acid, linoleic acid, linolenic acid or stearic acid. Furthermore, semiesters of aliphatic, cycloaliphatic or aromatic dicarboxylic anhydrides with saturated or unsaturated monoalcohols can be used.

The amine groups of the binders of the invention are partially or totally neutralized with organic and/or inorganic acids, e.g., formic acid, acetic acid, lactic acid, phosphoric acid, etc., and are then diluted with water. The degree of neutralization depends upon the characteristics of the individual binder. The preferred binder composition allows dilution or dispersion with water at pH-value of from 4 to 9, preferably 6 to 8.

The concentration in water of the binder depends upon the parameters of electrodeposition and may lie in a range of between 3 to 30% by weight, preferably of from 5 to 15% by weight. The applied coating composition may optionally contain various additives, including pigments, extenders, surface active agents, etc.

Upon electrodeposition of the binder of the invention as a vehicle of the aqueous coating composition is wired to a conductive anode and cathode, the surface of the cathode being coated with the coating composition. The conductive substrates to be coated may be of a variety of materials, particularly of metals such as steel, aluminum, copper, etc., but also of other metalized materials or materials rendered conductive through a conductive coating.

After deposition, the coating is cured at a stoving schedule of from 130° to 200° C., preferably 150° to 180° C., for about 5 to 30 minutes, preferably 10 to 25 minutes.

The following examples illustrate the invention without limiting the scope of it.

Preparation of the Monoisocyanate Intermediates

The isocyanate was charged to a suitable reaction vessel and, excluding access of humidity, the isocyanate-reactive compound was continuously added to 20° to 30° C. within 1 hour. The batch was thereafter held at 30° to 35° C. for another 30 minutes.

The composition of the various intermediates is listed in the table headed "Intermediates." The formulations contain an average of 1 equivalent of free isocyanate groups.

| Intermediates | |
|---|---|
| Quantity (g) and type of isocyanate | Quantity (g) and type of reaction partners (pairs) |
| A 174 toluenediisocyanate | 89 dimethylethanolamine |
| B 174 toluenediisocyanate | 117 diethylethanolamine |
| C 174 toluenediisocyanate | 145 diisopropylethanolamine |
| D 174 toluenediisocyanate | 103 dimethylpropanolamine |
| E 222 isophoronediisocyanate | 103 dimethylpropanolamine |
| F 168 hexamethylenediisocyanate | 131 diethylpropanolamine |
| G 174 toluenediisocyanate | 172 6-hydroxyhexylacrylate |
| H 174 toluenediisocyanate | 350 tetrapropyleneglycolmonomethacrylate |
| I 174 toluenediisocyanate | 268 oleylalcohol |
| K 174 toluenediisocyanate | 266 linolenylalcohol |
| L 174 toluenediisocyanate | 44.5 dimethylethanolamine (0.5) 134 Oleylalcohol (0.5) |
| M 174 toluenediisocyanate | 200 laurylic acid |
| N 174 toluenediisocyanate | 278 linolenic acid |
| O 174 toluenediisocyanate | 242 semiester of maleic anhydride and hydroxybutylacrylate |
| P 174 toluenediisocyanate | 44.5 dimethylethanolamine (0.5) 146 oleic acid (0.5) |

The following is a key to abbreviations used in Tables 1–4 referred to in the following examples:

EPH A: liquid epoxy resin based on Bisphenol A (4,4'-bis(hydroxyphenyl) propane) with an epoxy equivalent of from 180 to 190.
EPH B: solid epoxy resin based on Bisphenol A with a melting range of from 65° to 75° C.; an epoxy equivalent of from 485 to 510, and a molecular weight of about 1000.
EPH C: highly viscous epoxy resin based on Bisphenol A with an epoxy equivalent of about 260.
COP I: solution polymer, prepared in known manner in 66.5% solution in AEGLAC from 300 parts of methylmethacrylate, 250 parts of ethylacrylate, 284 parts of glycidylmethacrylate and 160 parts of styrene. Viscosity Gardner O-P (60% in AEGLAC).
ACS: acrylic acid
MACS: methacrylic acid
ADI: adipic acid
SUB: suberic acid
AEGLAC: monoethyleneglycolmonoethyletheracetate (ethylglycolacetate)
AEAC: ethylacetate
DMF: dimethylformamide
HY: hydroquinone
FKP: resin solids (% by weight)

EXAMPLES OF THE INVENTION

Examples 1-9

These examples describe the reaction of epoxy-acrylic-intermediates with basic monoisocyanate intermediates.

In a reaction vessel equipped with stirrer, addition funnel, thermometer and reflux condenser, a solution of the epoxy compound in an isocyanate inert solvent such as monoethyleneglycolmonoethyletheracetate (ethylglycol acetate), is charged. Hydroquinone, as inhibitor, is added. The unsaturated monocarboxylic acid is added at an elevated temperature. The reaction is carried to an acid value of below 5 mg KOH/g. With epoxy resins with low melting point, the reaction can be carried out without a solvent. The solution of the reaction product is mixed with the basic monoisocyanate intermediate and is reacted, preventing access of humidity, at 50° to 60° C. for 1 to 2 hours, until an —NCO value of 0 is attained.

The quantities of the components and the reaction conditions are listed in Table 1.

Examples 10-12

These examples describe the reaction of a co-polymer carrying glycidyl groups with an unsaturated monocarboxylic acid and a basic isocyanate intermediate.

The acrylic resin solution after addition of the inhibitor is mixed at about 90° C. with the unsaturated monocarboxylic acid and is reacted at 100° to 105° C. until an acid value of below 5 mg KOH/g is obtained. After cooling to about 50° C., the isocyanate intermediate is added and the reaction is carried out at 60° C., until an —NCO value of 0 is attained.

Quantities and conditions are listed in Table 1.

Examples 13-20

In a reaction vessel equipped with stirrer, addition funnel, thermometer and reflux condenser, the epoxy compound is charged in an isocyanate inert solvent such as monoethylene glycolmonoethyletheracetate (ethylglycolacetate), and upon addition of hydroquinone as an inhibitor, the dicarboxylic acid and the unsaturated monocarboxylic acid are added. The reaction is carried out at 100° to 130° C. until an acid value of below 5 mg KOH/g is obtained. (Epoxy resins with low melting point can be reacted without solvents). The solution of the reaction product is mixed with the basic monoisocyanate intermediate and, preventing access of humidity, the reaction is carried out at 60° to 70° C. for 1 to 3 hours, until an —NCO value of 0 is attained.

The reaction of the epoxy compound with the dicarboxylic acid and the unsaturated monocarboxylic acid can be carried out in separate reaction steps without substantial changes in the results. Compositions and reaction conditions are listed in Table 2.

Examples 21-29

In a reaction vessel equipped with stirrer, addition funnel, thermometer and reflux condenser, the solution of the epoxy compound is an isocyanate inert solvent such as monoethyleneglycolmonoethylether acetate (ethylglycol acetate) is charged. Hydroquinone, as an inhibitor, is added. The unsaturated monocarboxylic acid is added at an elevated temperature. The reaction is carried to an acid value of below 5 mg KOH/g. When using an epoxy resin with low melting point the reactions can be carried out without solvents. The solution of the reaction product is mixed with the basic monoisocyanate intermediates and is reacted, preventing access of humidity, at 60° to 70° C. for 1 to 3 hours, until an —NCO value of 0 is attained. The reaction with the isocyanate intermediates may be effected in two steps, that is first with the basic isocyanate and then with the plasticizing isocyanate. The results are practically identical.

The quantities of the components and the reaction conditions are listed in Table 3.

Examples 30–38

In a reaction vessel equipped with stirrer, addition funnel, thermometer and reflux condensor, a solution of an epoxy compound in an isocyanate inert solvent such as monoethyleneglycolmonoethylether acetate (ethylglycol acetate) is charged. Hydroquinone, as an inhibitor, is added. The unsaturated monocarboxylic acid is added at elevated temperature. The reaction is carried to an acid value of below 5 mg KOH/g. When using an epoxy resin with a low melting point, the reaction can be carried out without solvents. The solution of the reaction product is mixed with the basic monoisocyanate intermediates and is reacted, preventing access of humidity, at 60° to 70° C. for 1 to 3 hours, until an —NCO value of 0 is attained. The reaction with the isocyanate intermediates may be carried out in two steps, that is first with the basic isocyanate and then with plasticizing isocyanate. The results are practically identical.

The quantities of the components and the reaction conditions are listed in Table 4.

TABLE 1

| | base resin and solvent | | inhibitor HY (g) | unsatur. acid ACS (g) | reaction conditions | | FKP % | monoisocyanate intermediate | | reaction conditions |
|---|---|---|---|---|---|---|---|---|---|---|
| | type | quantity (g) | | | temp. °C. | final acid value mg KOH/g | | type & solution | quantity (g) | time (hours/ temp. °C.) |
| 1 | EPH A AEGLAC | 380 131 | 0.1 | 144 | 100–105 | <3 | 80 | A (80%AEAC) | 329 | 2/40–50 |
| 2 | | | | as in Example 1 | | | | B (80%AEAC) | 373 | 2/40–50 |
| 3 | | | | as in Example 1 | | | | C (80%AEAC) | 398 | 2/40–50 |
| 4 | | | | as in Example 1 | | | | E (80%AEAC) | 407 | 2/40–50 |
| 5 | EPH B AEGLAC | 1000 492 | 0.2 | 144 | 100–105 | <5 | 70 | A (70%AEAC) | 376 | 2/60 |
| 6 | | | | as in Example 5 | | | | A (70%AEAC) | 652 | 2/60 |
| 7 | | | | as in Example 5 | | | | C (70%AEAC) | 850 | 2/60 |
| 8 | | | | as in Example 5 | | | | E (70%AEAC) | 697 | 2/60 |
| 9 | | | | as in Example 5 | | | | F (70%AEAC) | 640 | 2/60 |
| 10 | COP I AEGLAC | 994 500 | 0.2 | 144 | 100–105 | <5 | 70 | A (70%AEAC) | 376 | 2/60 |
| 11 | | | | as in Example 10 | | | | B (70%AEAC) | 427 | 2/60 |
| 12 | | | | as in Example 10 | | | | E (70%AEAC) | 464 | 2/60 |

TABLE 2

| | epoxy compound and solvent | | dicarboxylic acid | | inhibitor HY (g) | unsat. acid ACS (g) | FKP % | monoisocyanate intermediate | | reaction conditions NCO value to 0 | |
|---|---|---|---|---|---|---|---|---|---|---|---|
| | type | quantity (g) | type | quantity (g) | | | | type solution | quantity (g) | hours | temp. °C. |
| 13 | EPH A AEGLAC | 720 252 | ADI | 146 | 0.1 | 144 | 80 | A (80% AEAC) | 493 | 1–2 | 60–70 |
| 14 | as in Example 1 | | ADI | 146 | 0.1 | 144 | 80 | B (80% AEAC) | 545 | 1–2 | 60–70 |
| 15 | as in Example 1 | | ADI | 146 | 0.1 | 144 | 80 | E (80% AEAC) | 608 | 2–3 | 70 |
| 16 | EPH A AEGLAC | 720 260 | ADI | 146 | 0.1 | 172 MACS | 80 | F (80% AEAC) | 560 | 2–3 | 60–70 |
| 17 | EPH A AEGLAC | 720 260 | SUB | 174 | 0.1 | 144 | 80 | A (80% AEAC) | 493 | 1–2 | 60–70 |
| 18 | EPH C AEGLAC | 1040 582 | SUB | 174 | 1.5 | 144 | 70 | A (70% AEAC) | 752 | 1–2 | 60–70 |
| 19 | EPH C AEGLAC | 1040 582 | SUB | 174 | 1.5 | 144 | 70 | D (70% AEAC) | 794 | 1–2 | 60–70 |
| 20 | EPH C AEGLAC | 1040 582 | SUB | 174 | 1.5 | 144 | 70 | F (70% AEAC) | 856 | 2–3 | 70 |

TABLE 3

| | base resin and solvent | | inhibitor HY (g) | unsatur. acid g | FKP % | monoisocyanate intermediate | | | | reaction conditions hours/temp. °C. |
|---|---|---|---|---|---|---|---|---|---|---|
| | | | | | | basic | | plasticized | | |
| | type | quantity (g) | | | | type solution | quantity (g) | type | quantity (g) | |
| 21 | EPH A AEGLAC | 380 131 | 0.1 | 144 ACS | 80 | A (80% AEAC) | 329 | G | 173 | 2/60–70 |
| 22 | EPH A | 380 | 0.1 | 144 ACS | 80 | A (80% AEAC) | 329 | H | 262 | 2/60–70 |

TABLE 3-continued

| | base resin and solvent | | inhibitor HY (g) | unsatur. acid g | FKP % | monoisocyanate intermediate | | | | reaction conditions hours/temp. °C. |
|---|---|---|---|---|---|---|---|---|---|---|
| | type | quantity (g) | | | | basic type solution | quantity (g) | plasticized type | quantity (g) | |
| 23 | EPH A AEGLAC | 380 131 | 0.1 | 144 ACS | 80 | A (80% AEAC) | 329 | I | 221 | 2/60–70 |
| 24 | EPH A AEGLAC | 380 131 | 0.1 | 172 MACS | 80 | B (80% AEAC) | 336 | K | 220 | 2/60–70 |
| 25 | EPH A AEGLAC | 380 140 | 0.1 | 172 MACS | 80 | D (80% AEAC) | 347 | G | 173 | 2/60–70 |
| 26 | EPH B AEGLAC | 1000 492 | 0.18 | 144 ACS | 70 | A (70% AEAC) | 753 | G | 346 | 2/60–70 |
| 27 | EPH B AEGLAC | 1000 492 | 0.18 | 144 ACS | 70 | A (70% AEAC) | 753 | I | 442 | 2/60–70 |
| 28 | EPH B AEGLAC | 1000 492 | 0.18 | 144 ACS | 70 | A (70% AEAC) | 753 | K | 440 | 2/60–70 |
| 29 | EPH A AEGLAC | 380 131 | 0.1 | 144 ACS | 80 | L (80% AEAC) | 751 | | | 2/60–70 |

TABLE 4

| | base resin and solvent | | inhibitor HY (g) | unsatur. acid g | FKP % | isocyanate intermediate | | | | reaction conditions hours/temp. °C. |
|---|---|---|---|---|---|---|---|---|---|---|
| | type | quantity (g) | | | | basic type solution | quantity (g) | plasticized type | quantity (60% in DMF) | |
| 30 | EPH A AEGLAC | 380 131 | 0.1 | 144 ACS | 80 | A (80% AEAC) | 329 | M | 312 | 2/60–70 |
| 31 | EPH A AEGLAC | 380 131 | 0.1 | 144 ACS | 80 | A (80% AEAC) | 329 | O | 322 | 2/60–70 |
| 32 | EPH A AEGLAC | 380 131 | 0.1 | 144 ACS | 80 | A (80% AEAC) | 329 | N | 354 | 2/60–70 |
| 33 | EPH A AEGLAC | 380 131 | 0.1 | 172 MACS | 80 | B (80% AEAC) | 366 | N | 354 | 2/60–70 |
| 34 | EPH A AEGLAC | 380 140 | 0.1 | 172 MACS | 80 | D (80% AEAC) | 347 | M | 312 | 2/60–70 |
| 35 | EPH B AEGLAC | 1000 492 | 0.18 | 144 ACS | 70 | A (70% AEAC) | 753 | N | 708 | 2/60–70 |
| 36 | EPH B AEGLAC | 1000 492 | 0.18 | 144 ACS | 70 | A (70% AEAC) | 753 | O | 644 | 2/60–70 |
| 37 | EPH B AEGLAC | 1000 492 | 0.18 | 144 ACS | 70 | A (70% AEAC) | 753 | M | 612 | 2/60–70 |
| 38 | EPH A AEGLAC | 380 131 | 0.1 | 144 ACS | 80 | P (70% AEAC/DMF) | 885 | | | 2/60–70 |

EVALUATION OF THE COATING COMPOSITIONS OF EXAMPLES 1–38

Each 100 g of the listed coating compositions, resin solids, were mixed with the designated acid and, while stirring, made up to 1000 g with deionized water. The 10% solutions were cathodically deposited on various substrates. Deposition time was 60 seconds in all cases. The coated substrates were rinsed with deionized water and cured at elevated temperature.

Thickness of the cured films averaged 13 to 17 μm.

Table 5 gives the compiled results wherein
(1) is the quantity of acid in grams per 100 g resin solids;
(2) is the acid wherein E=acetic acid, A=formic acid, and M=lactic acid;
(3) is the pH measured on a 10% aqueous solution;
(4) is the substrate wherein ST=steel, AL=aluminum, and CU=copper;
(5) König pendulum hardness DIN 53 157 (sec);
(6) Erichsen indentation DIN 53 156 (mm);
(7) hours of water soak at 40° C. until blistering and corrosion become visible; and
(8) ASTM-B-117-64 salt spray: 2 mm of corrosion at the cross incision after the recorded hours.

The coating compositions were tested as pigmented paint utilizing 100 parts resin solids, 20 parts aluminum silicate pigment, and 2 parts carbon black.

TABLE 5

| | neutralization | | | deposition | | | tests | | |
|---|---|---|---|---|---|---|---|---|---|
| | (1) quantity (g) | (2) type | (3) pH | (4) substrate | volt | cure min/°C. | (5) hardness | (6) indentation | (7)/(8) resistance |
| 1 | 3.6 | E | 7.3 | ST | 130 | 25/170 | 195 | 5.9 | 480/210 |
| 2 | 3.6 | E | 7.2 | ST | 140 | 15/180 | 185 | 6.2 | 480/230 |
| 3 | 4.0 | A | 6.4 | ST | 125 | 20/180 | 185 | 6.0 | 240/110 |
| 4 | 3.8 | A | 6.5 | ST | 150 | 20/175 | 190 | 6.2 | 360/150 |
| 5 | 3.6 | E | 6.1 | ST | 240 | 20/180 | 210 | 8.1 | 480/240 |
| 6 | 3.8 | E | 7.8 | ST | 290 | 20/180 | 195 | 8.2 | 480/200 |
| 7 | 4.2 | E | 7.1 | AL | 260 | 20/175 | 190 | 7.8 | 360/— |
| 8 | 3.8 | E | 6.8 | AL | 280 | 25/175 | 190 | 7.7 | 480/— |

TABLE 5-continued

| | neutralization | | | deposition | | | tests | | |
|---|---|---|---|---|---|---|---|---|---|
| | (1) quantity (g) | (2) type | (3) pH | (4) substrate | volt | cure min/°C. | (5) hardness | (6) indentation | (7)/(8) resistance |
| 9  | 3.8 | E | 6.6 | ST | 270 | 20/180 | 175 | 8.5 | 360/180 |
| 10 | 3.6 | E | 6.3 | ST | 290 | 20/180 | 170 | 8.0 | 360/180 |
| 11 | 3.6 | E | 6.2 | CU | 280 | 20/180 | 170 | 7.8 | 240/— |
| 12 | 3.6 | E | 6.2 | ST | 290 | 20/180 | 180 | 7.6 | 360/180 |
| 13 | 3.5 | E | 6.2 | ST | 210 | 15/180 | 165 | 7.2 | 360/240 |
| 14 | 3.6 | E | 6.1 | ST | 220 | 15/180 | 165 | 7.1 | 360/240 |
| 15 | 4.0 | E | 6.0 | ST | 220 | 25/180 | 175 | 7.2 | 480/300 |
| 16 | 3.8 | E | 6.0 | ST | 220 | 25/180 | 160 | 7.8 | 360/240 |
| 17 | 4.2 | M | 6.3 | ST | 230 | 15/180 | 170 | 8.5 | 360/200 |
| 18 | 4.5 | M | 6.5 | ST | 260 | 20/180 | 180 | 7.8 | 480/360 |
| 19 | 4.5 | M | 6.6 | ST | 260 | 20/180 | 180 | 8.0 | 480/320 |
| 20 | 4.4 | M | 6.6 | ST | 230 | 25/180 | 175 | 8.1 | 360/240 |
| 21 | 3.6 | E | 6.0 | ST | 190 | 15/170 | 165 | 7.1 | 480/360 |
| 22 | 3.5 | E | 6.1 | ST | 210 | 15/180 | 160 | 7.5 | 480/240 |
| 23 | 3.4 | E | 6.2 | ST | 210 | 20/180 | 160 | 7.5 | 360/200 |
| 24 | 3.5 | E | 6.1 | ST | 210 | 20/180 | 160 | 7.4 | 360/220 |
| 25 | 3.2 | E | 6.3 | ST | 220 | 15/170 | 165 | 7.1 | 480/360 |
| 26 | 4.5 | M | 6.6 | ST | 260 | 15/170 | 190 | 8.5 | 480/240 |
| 27 | 4.5 | M | 6.6 | ST | 280 | 20/180 | 175 | 8.8 | 360/220 |
| 28 | 4.5 | M | 6.6 | ST | 280 | 20/180 | 175 | 8.6 | 360/200 |
| 29 | 3.8 | E | 5.9 | ST | 200 | 20/180 | 170 | 7.8 | 360/200 |
| 30 | 3.6 | E | 6.0 | ST | 190 | 15/170 | 165 | 7.1 | 280/160 |
| 31 | 3.5 | E | 6.0 | ST | 210 | 15/180 | 160 | 7.0 | 280/140 |
| 32 | 3.4 | E | 6.2 | ST | 210 | 20/180 | 160 | 7.5 | 360/200 |
| 33 | 3.5 | E | 6.1 | ST | 210 | 20/180 | 160 | 7.4 | 360/220 |
| 34 | 3.5 | E | 6.0 | ST | 220 | 15/170 | 165 | 7.0 | 280/160 |
| 35 | 5.5 | M | 6.2 | ST | 260 | 15/170 | 190 | 8.5 | 380/140 |
| 36 | 4.5 | M | 6.0 | ST | 200 | 20/180 | 175 | 7.8 | 260/120 |
| 37 | 4.0 | M | 6.0 | ST | 280 | 20/180 | 175 | 8.0 | 240/120 |
| 38 | 3.8 | E | 5.9 | ST | 200 | 20/180 | 170 | 7.8 | 360/200 |

It is claimed:

1. Process for producing self-crosslinking coating compositions for cathodically depositable electrodeposition paints including the steps of reacting (A) an unsaturated copolymer or a polycondensation reaction product or a polyaddition reaction product or mixture thereof carrying at least 0.5 ethylenically unsaturated bonds on a side chain or at the end of a chain for each 1000 molecular weight units; with (B) a sufficient amount to render the coating composition water dilutable when reacted with an inorganic or organic acid, of a reaction product carrying one free isocyanate group and which is obtained from aromatic or aliphatic or cycloaliphatic polyisocyanates or mixtures thereof and an amine of the general formula

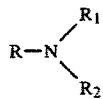

wherein R is an alkanol or hydroxyphenyl radical and $R_1$ and $R_2$ are alkyl, aryl or cycloalkyl radicals; and reacting the reaction product of (A) and (B) with an inorganic acid or an organic acid or mixtures thereof to provide a water-soluble coating composition.

2. Process according to claim 1 wherein component (A) carries from about 0.8 to 3.0 ethylenically unsaturated bonds on a side chain or at the end of a chain for each 1000 molecular weight units.

3. Process according to claim 1 wherein (A) is the polycondensation reaction product of an epoxy group containing resin and an α,β-ethylenically unsaturated monocarboxylic acid.

4. Process according to claim 1 wherein (A) is the polycondensation reaction product of 2 moles of a diepoxy compound, 1 mole of an aliphatic dicarboxylic acid and 2 moles of an acrylic acid or methacrylic acid or mixtures thereof.

5. Process according to claim 3 wherein said polycondensation reaction product is modified with a saturated or unsaturated fatty acid.

6. Process according to claim 1 wherein (A) is an unsaturated copolymer and is the reaction product of carboxy groups containing copolymers and unsaturated glycidyl compounds.

7. Process according to claim 1 wherein (A) is the reaction product of hydroxyl; and/or carboxyl group containing polycondensation reaction product or polyaddition reaction products or copolymer with an unsaturated monoisocyanate.

8. Process according to claim 1 wherein (A) is a polymeric semiester of an anhydride with hydroxyalkyl acrylates, methacrylates, or mixtures thereof.

9. Process according to claim 1 wherein the quantity of (B) is sufficient to render the coating composition water dilutable upon reaction with acids to a pH-value of from 4 to 9.

10. Process according to claim 9 wherein the pH-value is from 6 to 8.

11. Process according to claim 1 wherein the reaction of (A) with (B) is carried out at 20° to 80° C.

12. Process according to claim 11 wherein the reaction is carried out at 40°–60° C.

13. Process according to claim 1 wherein the reaction is carried out in the presence of an isocyanate inert solvent.

14. Process according to claim 1 wherein in addition to (A) and (B) there is present (C) from about 10 to 100 mole-% (calculated on the sum of the still free hydroxy and carboxy groups) of a reaction product carrying one free isocyanate group, obtained from an aliphatic or aromatic or cycloaliphatic polyisocyanate and mixtures thereof and a hydroxy alkyl acrylate or methacrylate with at least 6 C-atoms and a saturated or unsaturated monoalcohol with at least 6 C-atoms and mixtures thereof.

15. Process according to claim 1 wherein in addition to (A) and (B) there is present (C) from about 10 to 100 mole-% (calculated on the sum of the still free hydroxy and carboxy groups) of a reaction product carrying one free isocyanate group, obtained from an aliphatic or aromatic or cycloaliphatic polyisocyanate and mixtures thereof and an unsaturated or saturated monocarboxylic acid or mixtures thereof with at least 6 C-atoms.

16. Process according to claim 11 wherein (A) and (B) are first reacted followed by reaction with reaction product (C).

17. Process according to claim 11 wherein (A) and (B) and reaction product (C) are reacted simultaneously.

18. Process for producing self-crosslinking coating compositions for cathodically depositable electrodeposition paints including the steps of reacting (A) an unsaturated copolymer or a polycondensation reaction product or a polyaddition reaction product or mixture thereof carrying at least 0.5 ethylenically unsaturated bonds on a side chain or at the end of a chain for each 1000 molecular weight units; with (B) a sufficient amount to render the coating composition water dilutable when reacted with an inorganic or organic acid, of a mixed isocyanate intermediate of (a) 1 mole of diisocyanate, (b) 0.4 to 0.9 moles of a tertiary alkanolamine, and (c) 0.1 to 0.6 moles of a hydroxyalkylacrylate or methacrylate with at least 6 C-atoms and a monoalcohol with at least 6 C-atoms, the mole sum of the components (b) and (c) being 1.0; and reacting the reaction product of (A) and (B) with an inorganic acid or an organic acid or mixtures thereof to provide a water-soluble coating composition.

19. Process for producing self-crosslinking coating compositions for cathodically depositable electrodeposition paints including the steps of reacting (A) an unsaturated copolymer or a polycondensation reaction product or a polyaddition reaction product or mixture thereof carrying at least 0.5 ethylenically unsaturated bonds on a side chain or at the end of a chain for each 1000 molecular weight units; with (B) a sufficient amount to render the coating composition water dilutable when reacted with an inorganic or organic acid, of a mixed isocyanate intermediate of (a) 1 mole of diisocyanate, (b) 0.4 to 0.9 moles of a tertiary alkanolamine, and (c) 0.1 to 0.6 moles of a monocarboxylic acid with at least 6 C-atoms, the mole sum of the components (b) and (c) being 1.0; and reacting the reaction product of (A) and (B) with an inorganic acid or an organic acid or mixtures thereof to provide a water-soluble coating composition.

20. Self-crosslinking coating composition which will cathodically deposit upon electrodeposition which is the reaction product of (A) an unsaturated copolymer or a polycondensation product or a polyaddition product or mixture thereof carrying at least 0.5 ethylenically unsaturated bonds on a side chain or at the end of a chain for each 1000 molecular weight units; and (B) a sufficient amount to render the coating composition water dilutable when reacted with an inorganic or organic acid, of a reaction product carrying one free isocyanate group of an aromatic or aliphatic or cycloaliphatic polyisocyanate or mixtures thereof and an amine of the general formula

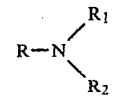

wherein R is an alkanol or hydroxyphenyl radical and $R_1$ and $R_2$ are alkyl, aryl, or cycloalkyl radicals.

21. Coating composition according to claim 20 wherein component (A) carries from about 0.8 to 3.0 ethylenically unsaturated bonds on a side chain or at the end of a chain for each 1000 molecular weight units.

22. Coating composition according to claim 20 wherein component (A) is the polycondensation reaction product of an epoxy group containing resin and an $\alpha,\beta$-ethylenically unsaturated monocarboxylic acid.

23. Coating composition according to claim 20 wherein component (A) is the polycondensation reaction product of 2 moles of a diepoxy compound, 1 mole of an aliphatic dicarboxylic acid and 2 moles of an acrylic acid or methacrylic acid or mixtures thereof.

24. Coating composition according to claim 20 wherein component (A) is an unsaturated copolymer and is the reaction product of carboxy groups containing copolymers and unsaturated glycidyl compounds.

25. Coating compositions according to claim 20 wherein component (A) is the reaction product of hydroxyl; and/or carboxyl group containing polycondensation reaction product or polyaddition reaction products or copolymer with an unsaturated monoisocyanate.

26. Coating composition according to claim 20 wherein component (A) is a polymeric semiester of anhydride structure with hydroxyalkyl acrylates, methacrylates, or mixtures thereof.

27. Self-crosslinking coating composition which will cathodically deposit upon electrodeposition which is the reaction products of (A) an unsaturated copolymer or a polycondensation reaction product or a polyaddition reaction product or mixture thereof carrying at least 0.5 ethylenically unsaturated bonds on a side chain or at the end of a chain for each 1000 molecular weight units; (B) a sufficient amount to render the coating composition water dilutable when reacted with an inorganic or organic acid, of a reaction product carrying one free isocyanate group of an aromatic or aliphatic or cycloaliphatic polyisocyanate or mixtures thereof and an amine of the general formula

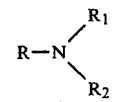

wherein R is an alkanol or hydroxyphenyl radical and $R_1$ and $R_2$ are alkyl or aryl or cycloalkyl radicals; and (C) from about 10 to 100 mole-%, calculated on the sum of the still free hydroxy and carboxy groups, of a reaction product carrying one free isocyanate group, obtained from an aliphatic or aromatic or cycloaliphatic polyisocyanate and mixtures thereof and a hydroxy alkyl acrylate or methacrylate with at least 6 C-atoms; a saturated or unsaturated monoalcohol with at least 6 C-atoms and mixtures thereof.

28. Self-crosslinking coating composition which will cathodically deposit upon electrodeposition which is the reaction products of (A) an unsaturated copolymer or a polycondensation reaction product or a polyaddition reaction product or mixture thereof carrying at least 0.5 ethylenically unsaturated bonds on a side chain or at the end of a chain for each 1000 molecular weight units; (B) a sufficient amount to render the coating composition water dilutable when reacted with an inorganic or organic acid, of a reaction product carrying one free isocyanate group of an aromatic or aliphatic or cycloaliphatic polyisocyanate or mixtures thereof and an amine of the general formula

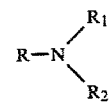

wherein R is an alkanol or hydroxyphenyl radical and $R_1$ and $R_2$ are alkyl or aryl or cycloalkyl radicals; and (C) from about 10 to 100 mole-%, calculated on the sum of the still free hydroxy and carboxy groups, of a reaction product carrying one free isocyanate group, obtained from an aliphatic or aromatic or cycloaliphatic polyisocyanate and mixtures thereof and an unsaturated or saturated monocarboxylic acid or mixtures thereof with at least 6 C-atoms.

* * * * *